US012791861B1

(12) United States Patent
Matranga

(10) Patent No.: US 12,791,861 B1
(45) Date of Patent: Nov. 10, 2026

(54) DIMMABLE DISPLAY SYSTEM INCLUDING A BISTABLE FILTER

(71) Applicant: Snap Inc., Santa Monica, CA (US)

(72) Inventor: Mario Ariosto Matranga, Chandler, AZ (US)

(73) Assignee: Snap Inc., Santa Monica, CA (US)

( * ) Notice: Subject to any disclaimer, the term of this patent is extended or adjusted under 35 U.S.C. 154(b) by 289 days.

(21) Appl. No.: 18/604,251

(22) Filed: Mar. 13, 2024

Related U.S. Application Data

(60) Provisional application No. 63/513,436, filed on Jul. 13, 2023.

(51) Int. Cl.
*G02B 27/01* (2006.01)
*G02F 1/01* (2006.01)

(52) U.S. Cl.
CPC ....... *G02B 27/0172* (2013.01); *G02F 1/0121* (2013.01); *G02B 2027/0118* (2013.01)

(58) Field of Classification Search
None
See application file for complete search history.

(56) References Cited

U.S. PATENT DOCUMENTS 5,638,195 A * 6/1997 Katakura ............. G09G 3/3637 349/37
10,578,877 B1 * 3/2020 Lin ........................ H04N 23/63
12,298,514 B1 5/2025 Steger
2008/0170018 A1 * 7/2008 Jones ................ G02F 1/133753 345/89
2009/0322891 A1 * 12/2009 Kondo ................... H04N 23/90 348/E5.024
2012/0068913 A1 * 3/2012 Bar-Zeev ............. G02B 27/017 345/8
2012/0154277 A1 6/2012 Bar-zeev et al.
2014/0168089 A1 6/2014 Geaghan
2017/0336641 A1 11/2017 Von Und Zu Liechtenstein (Continued)

FOREIGN PATENT DOCUMENTS

CN 114415372 8/2023
WO WO-2023137240 A2 7/2023

OTHER PUBLICATIONS

"U.S. Appl. No. 18/301,729, Final Office Action mailed Sep. 4, 2024", 26 pgs.

(Continued)

*Primary Examiner* — Robert E. Tallman
(74) *Attorney, Agent, or Firm* — Schwegman Lundberg & Woessner, P.A.

(57) ABSTRACT

A dimmable display system can include a headset frame wearable by a user. A window can be disposed in or on the headset frame such that when the headset frame is worn by the user, a field of view of an eye of the user extends through at least part of the window. A bistable filter, located adjacent to the window and at least partially in the field of view of the eye, can be switchable between a first stable equilibrium state and a second stable equilibrium state. The bistable filter can have a first value of transmissivity when in the first stable equilibrium state and a second value of transmissivity when in the second stable equilibrium state. The bistable filter may not consume any electrical power when the bistable filter is in the first stable equilibrium state or the second stable equilibrium state.

19 Claims, 5 Drawing Sheets

(56) References Cited

U.S. PATENT DOCUMENTS

| | | | | |
|---|---|---|---|---|
| 2018/0101988 | A1 | 4/2018 | Murillo et al. | |
| 2019/0004325 | A1 | 1/2019 | Connor | |
| 2020/0111259 | A1 * | 4/2020 | Sears | G02B 27/0172 |
| 2022/0365370 | A1 | 11/2022 | Singh et al. | |
| 2023/0267677 | A1 | 8/2023 | Mathur et al. | |
| 2025/0067982 | A1 | 2/2025 | Jang et al. | |
| 2025/0237872 | A1 | 7/2025 | Steger | |

OTHER PUBLICATIONS

"U.S. Appl. No. 18/301,729, Examiner Interview Summary mailed Oct. 18, 2024", 3 pgs.
"U.S. Appl. No. 18/301,729, Response filed Oct. 23, 2024 to Final Office Action mailed Sep. 4, 2024", 11 pgs.
"U.S. Appl. No. 18/301,729, Advisory Action mailed Nov. 5, 2024", 5 pgs.
"U.S. Appl. No. 18/301,729, Notice of Allowance mailed Jan. 8, 2025", 12 pgs.
"U.S. Appl. No. 18/301,729, Corrected Notice of Allowability mailed Mar. 18, 2025", 4 pgs.
Li, Y., "Visual mode switching learned through repeated adaptation to color", eLife. 9: e61179, DOI: https://doi.org/10.7554/eLife.61179, (2020), 1-16.
Li, Y., "Figures and figure supplements: Visual mode switching learned through repeated adaptation to color", elife. 9: e61179, DOI: https://doi.org/10.7554/eLife.61179, (2020), 1-9.
"U.S. Appl. No. 18/301,729, Non Final Office Action mailed May 21, 2024", 23 pgs.
"U.S. Appl. No. 18/301,729, Response filed Aug. 13, 2024 to Non Final Office Action mailed May 21, 2024", 15 pgs.
Chen, Haiwei, "Ambient contrast ratio of LCDs and OLED displays", Optics Express, vol. 25, No. 26: 33643, https://doi.org/10.1364/OE.25.033643, (2017), 14 pgs.
Jones, Cliff, "Bistable Liquid Crystal Displays", In: Chen, J., Cranton, W., Fihn, M. (eds) Handbook of Visual Display Technology. Springer, Cham, https://doi.org/10.1007/978-3-319-14346-0_92, (2016), 2157-2198.
Jones, J. Cliff, "The Zenithal Bistable Display: From Concept to Consumer", Journal of the Society for Information Display, 16(1), (2008), 41 pgs.
Xiong, Jianghao, "Augmented reality and virtual reality displays: emerging technologies and future perspectives", Science and Applications, vol. 10, Art. 216, https://doi.org/10.1038/s41377-021-00658-8, (2021), 30 pgs.
Zhan, Tao, "Augmented Reality and Virtual Reality Displays: Perspectives and Challenges", iScience, vol. 23, Iss. 8, 101397, https://doi.org/10.1016/j.isci.2020.101397, (Jan. 13, 2021), 13 pgs.
"U.S. Appl. No. 18/585,991, Non Final Office Action mailed May 13, 2026", 10 pgs.
"U.S. Appl. No. 19/173,246, Corrected Notice of Allowability mailed May 5, 2026", 4 pgs.
"U.S. Appl. No. 19/173,246, Notice of Allowance mailed Apr. 21, 2026", 12 pgs.

* cited by examiner

DIMMABLE DISPLAY SYSTEM INCLUDING A BISTABLE FILTER

CROSS-REFERENCE TO RELATED APPLICATION

This application claims the benefit of U.S. Provisional Application Ser. No. 63/513,436, filed on Jul. 13, 2023, which is hereby incorporated by reference in its entirety.

FIELD OF THE DISCLOSURE

The present disclosure relates generally to eyewear, such as augmented reality (AR) headsets.

BACKGROUND OF THE DISCLOSURE

Augmented reality (AR) headset displays can be partially transparent. An AR headset can present visual information to a user, which can be superimposed on the user's view of the user's surroundings. There is ongoing effort to improve AR headsets.

BRIEF DESCRIPTION OF THE DRAWINGS

Corresponding reference characters indicate corresponding parts throughout the several views. Elements in the drawings are not necessarily drawn to scale. The configurations shown in the drawings are merely examples and should not be construed as limiting in any manner.

DETAILED DESCRIPTION

A dimmable display system, such as a headset or eyewear, can include a dimmable element disposed in a field of view of an eye of the user. The dimmable element may controllably change its transmissivity (or opacity). For example, in a battery-operated augmented reality (AR) headset, a controller may change the transmissivity of the dimmable element in response to a light level in the user's surroundings, such as to increase a contrast of the image displayed in the headset.

An example of a dimmable element can include a liquid crystal panel, which can have one or more pixels. The liquid crystal panel can modulate light in response to an applied voltage or current. Such a voltage or current can consume power, which can limit an operational time of the headset before the headset requires the user to recharge the battery.

To extend the operational time of the headset, the headset can use a bistable filter as the dimmable element. The bistable filter can also include one or more pixels. Unlike a typical liquid crystal panel, the bistable filter may not require an applied voltage or current to remain in one of the stable equilibrium states. As a result, using the bistable filter as the dimmable element can increase the operational time of the headset before the headset requires the user to recharge the battery, compared to using a typical liquid crystal panel.

For example, a dimmable display system can include a headset frame wearable by a user. A window can be disposed in or on the headset frame such that when the headset frame is worn by the user, a field of view of an eye of the user extends through at least part of the window. A bistable filter, located adjacent to the window and at least partially in the field of view of the eye, can be switchable between a first stable equilibrium state and a second stable equilibrium state. The bistable filter can have a first value of transmissivity when in the first stable equilibrium state and a second value of transmissivity when in the second stable equilibrium state. The bistable filter may not consume any electrical power when the bistable filter is in the first stable equilibrium state or the second stable equilibrium state. By consuming power only when switching between the different equilibrium states, the dimmable display system can conserve power, and can therefore increase the operational time of the headset before the headset requires the user to recharge the battery.

Figure 1:
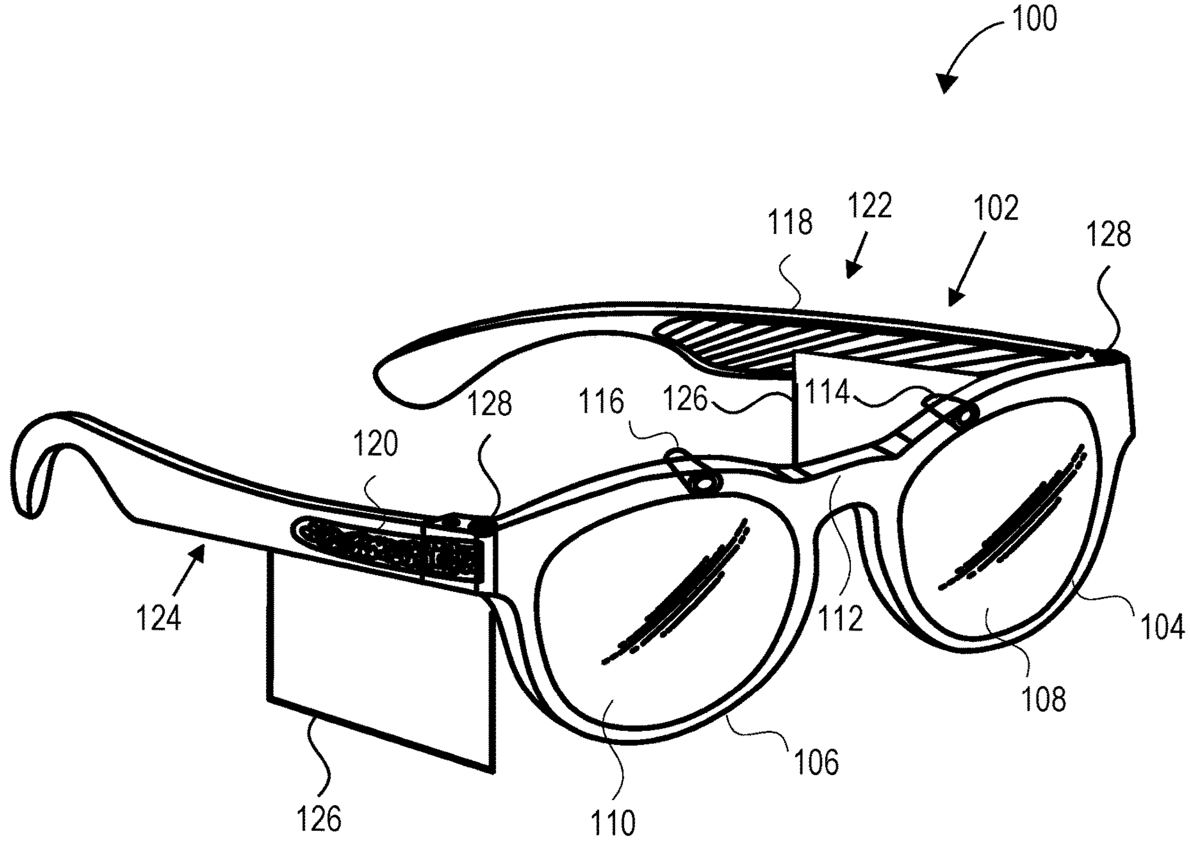
FIG. 1 shows a perspective view of an example of a head-worn extended reality (XR) device, such as glasses.
Figure 2:
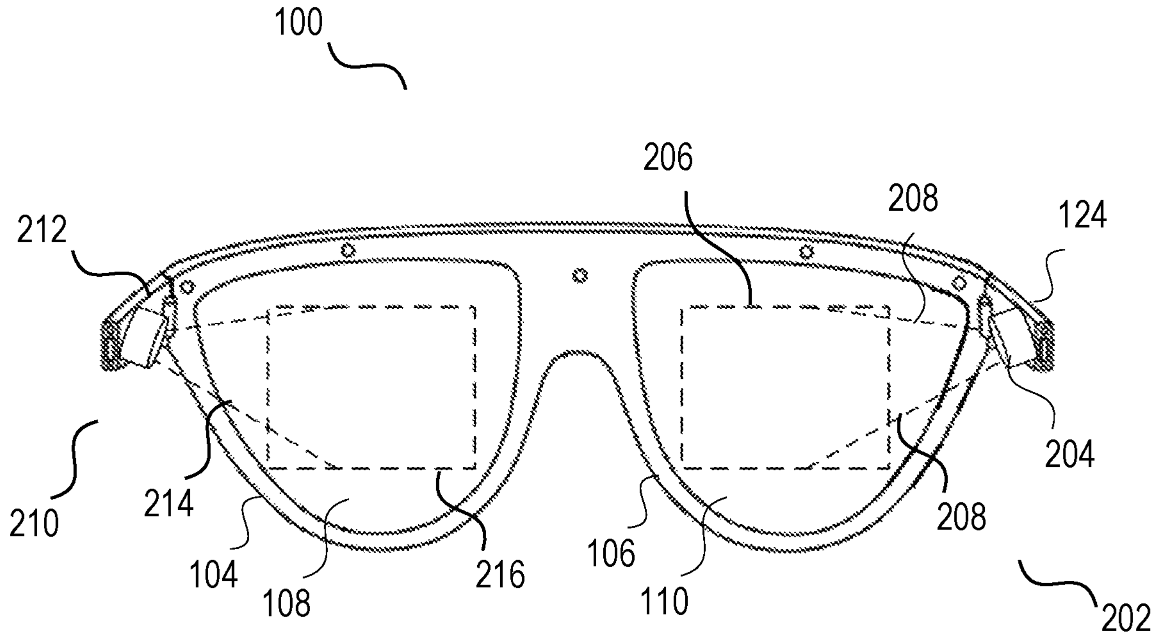
FIG. 2 shows the glasses of FIG. 1 from the perspective of a user.

FIGS. 1 and 2 and the accompanying text below provide a description of head-worn XR (e.g., either AR or VR) displays, such as incorporated into wearable headsets, such as glasses. FIGS. 3-6 and the accompanying text below provide a more specific description of dimmable aspects of the displays, including the bistable filter. Elements shown in FIGS. 3-6 may have different shapes or appearances than the corresponding elements of FIGS. 1 and 2; it will be understood that the drawings presented herein are not to scale, and that the size and/or shape of elements presented herein may vary from drawing to drawing.

FIG. 1 shows a perspective view of an example of a head-worn XR device, such as glasses 100. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples the frame 102 can be formed from a single piece of material so as to have a unitary or integral construction.

The glasses 100 can include a computing device, such as a computer 120, which can be of any suitable type so as to be carried by the frame 102 and, in one or more examples, of a suitable size and shape, so as to be partially disposed in one of the temple piece 122 or the temple piece 124. The computer 120 can include one or more processors with memory, wireless communication circuitry, and a power source. As discussed below, the computer 120 comprises low-power circuitry, high-speed circuitry, and a display processor. Various other examples may include these elements in different configurations or integrated together in different ways.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract three-dimensional (3D) information from a real world scene.

The glasses 100 may also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

FIG. 2 shows the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real world seen by the user. Similarly, light 214 emitted by the projector 212 encounters the diffractive structures of the waveguide of the near eye display 216, which directs the light towards the left eye of a user to provide an image on or in the left optical element 108 that overlays the view of the real world seen by the user. The combination of a GPU, the forward optical assembly 202, the left optical element 108, and the right optical element 110 provide an optical engine of the glasses 100. The glasses 100 use the optical engine to generate an overlay of the real-world view of the user including display of a 3D user interface to the user of the glasses 100.

It will be appreciated however that other display technologies or configurations may be utilized within an optical engine to display an image to a user in the user's field of view. For example, instead of a projector 204 and a waveguide, an LCD, LED or other display panel or surface may be provided.

Figure 3:
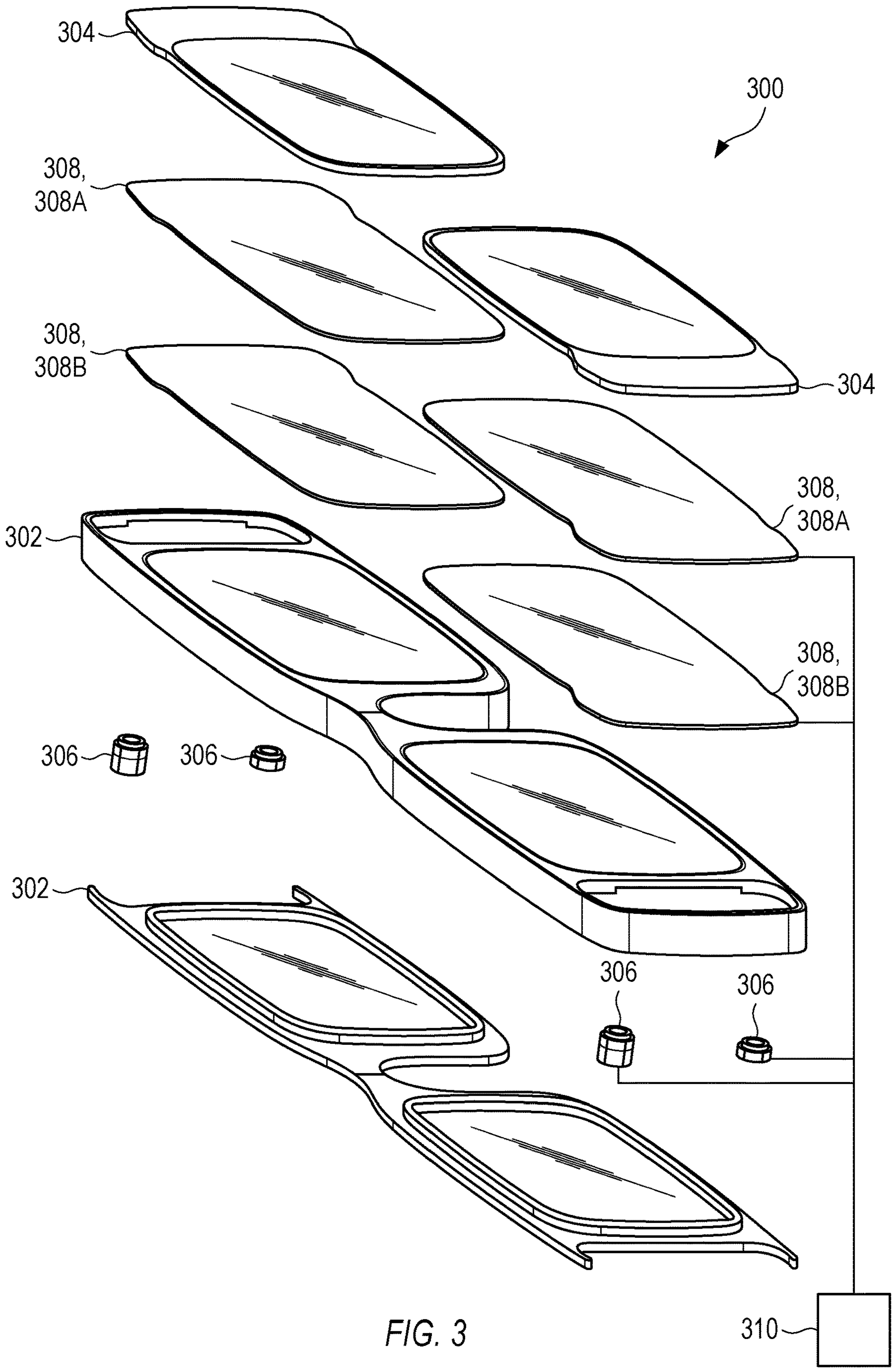
FIG. 3 shows an exploded view of an example of a dimmable display system.

FIGS. 3-6 and the accompanying text below provide a more specific description of dimmable aspects of the displays, including the bistable filter. FIG. 3 shows an exploded view of an example of a dimmable display system 300. The dimmable display system 300 can be configured as a headset. The dimmable display system 300 can include a headset frame 302 wearable by a user. The headset frame 302 can include a display and/or lens for each eye of the user. For simplicity, the following discussion pertains to one side of the headset, corresponding to a display for a single eye of the user. It will be understood that an additional display, corresponding to the other eye of the user, can optionally be formed in a similar manner to the display described below and optionally formed in a left-right mirror-image manner.

The dimmable display system 300 can include a window 304 disposed in or on the headset frame 302. The window 304 can be flat, can be curved in a rotationally symmetric manner (e.g., with spherical curvature), or can include compound curvature in more than one axis. In some examples, a single window 304 can extend over the displays for both eyes. In some examples, the display for each eye can include its own window 304.

The dimmable display system 300 can include a light sensor 306, such as a camera, disposed in or on the headset frame 302. The light sensor 306 can sense an amount of light in at least a portion of the field of view of the eye. For a light sensor 306 that includes a camera, the camera can be located such that when the headset frame 302 is worn by the user, the camera has a field of view that is directed away from the user and through the window 304. In some examples, when the headset frame 302 is worn by the user, a field of view of the eye of the user can at least partially overlap with the field of view of the camera. In some examples, the window 304 can be located at an outermost portion of the headset frame 302, such as a leftmost portion for the user's left eye or a rightmost portion for the user's right eye. The window 304 may be at least partially out of the field of view of the eye of the user. In some examples, the dimmable display system 300 can optionally include multiple light sensors 306, such as pointing in different directions and/or being sensitive in different portions of the electromagnetic spectrum (e.g., at different wavelengths or different wavelength regions).

The dimmable display system 300 can include a bistable filter 308, located adjacent to the window 304 and at least partially in the field of view of the eye. In some examples, the bistable filter 308 can be flexible and can be laminated to the window 304. In some examples, the bistable filter 308 can be laminated onto the eye side of the window 304. In other examples, the bistable filter 308 can be laminated onto the world side of the window 304. In some examples, when the headset frame 302 is worn by the user, the light sensor 306 can be located between the user and the bistable filter 308. In some examples, when the headset frame 302 is worn by the user, the bistable filter 308 can be located between the user and the window 304. In other examples, when the headset frame 302 is worn by the user, the window 304 can be located between the user and the bistable filter 308. In some examples, a light ray in the field of view of the eye passes through one of the window 304 or the bistable filter 308, then passes through the other of the window 304 or the bistable filter 308.

The bistable filter 308 can be switchable, such as electrically switchable, between a first stable equilibrium state and a second stable equilibrium state. The bistable filter 308 may not consume any electrical power when the bistable filter 308 is in the first stable equilibrium state or the second stable equilibrium state. The bistable filter 308 may consume electrical power when switching between the first stable equilibrium state and the second stable equilibrium state. The bistable filter 308 can have a first value of transmissivity (or opacity) when the bistable filter 308 is in the first stable equilibrium state and a second value of transmissivity (or opacity), different from the first value of transmissivity (or opacity), when the bistable filter 308 is in the second stable equilibrium state. For example, the first value of transmissivity can be 100%, 90%, 80%, 70%, or others, and the second value of transmissivity can be 10%, 20%, 30%, 40%, or others. These are but mere numerical examples; other suitable transmissivity values can also be used.

The dimmable display system 300 can include a controller 310. For example, the controller 310 can include one or more processors, and memory including instructions that, when executed by the one or more processors, cause the one or more processors to execute operations. In some examples, the operations can include one or more operations of a method 600 (FIG. 6) for operating a dimmable display system, or other suitable operations. The controller 310 can control the transmissivity of the bistable filter 308. The controller 310 can supply at least one of current or voltage to the bistable filter 308 to switch the bistable filter 308 between the first stable equilibrium state and the second stable equilibrium state. In some examples, the controller 310 can switch the bistable filter 308 between the first stable equilibrium state and the second stable equilibrium state based on the sensed amount of light from the light sensor 306. For clarity, FIG. 3 omits electrical connections between the controller 310 and the one or more light sensors 306 for the other eye, and an electrical connection between the controller 310 and the bistable filter 308 for the other eye.

Figure 4:
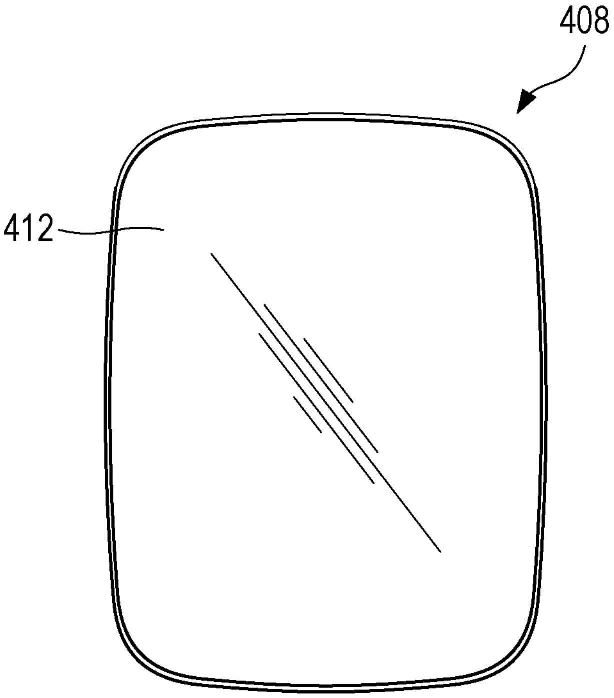
FIG. 4 shows a front view of an example of a bistable filter that includes a single filter region that is electrically switchable between the first stable equilibrium state and the second stable equilibrium state.

FIG. 4 shows a front view of an example of a bistable filter 408 that includes a single filter region 412 that is electrically switchable between the first stable equilibrium state and the second stable equilibrium state. For example, the bistable filter 408 can effectively take the form of one large pixel that extends over some or all of the field of view of the eye of the user. The single filter region 412 can extend over an active area of the bistable filter 408. The bistable filter 408 can include electrodes electrically coupled to the controller 310 (FIG. 3) and located to provide the current or voltage to the single filter region 412.

Figure 5:
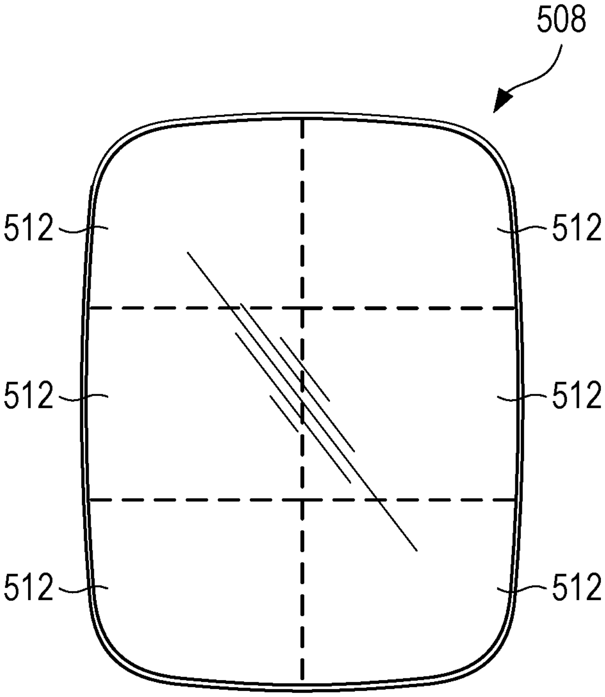
FIG. 5 shows a front view of an example of a bistable filter that includes a plurality of filter regions that are each electrically switchable between the first stable equilibrium state and the second stable equilibrium state.

FIG. 5 shows a front view of an example of a bistable filter 508 that includes a plurality of filter regions 512 that are each electrically switchable between the first stable equilibrium state and the second stable equilibrium state. For these examples, the bistable filter 508 can be segmented into the plurality of filter regions 512. Such segmenting can allow the controller 310 (FIG. 3) to selectively dim one or more portions of the field of view of the eye, independent of one or more other portions of the field of view of the eye. Each filter region 512 of the plurality of filter regions 512 can extend over a respective active area of the bistable filter 508. The bistable filter 508 can include electrodes electrically coupled to the controller 310 (FIG. 3) and located to provide the current or voltage to filter regions 512 of the plurality of filter regions 512. In some examples, at least two filter regions 512 of the plurality of filter regions 512 can be independently electrically switchable between the first stable equilibrium state and the second stable equilibrium state. In some examples, all of the filter regions 512 of the plurality of filter regions 512 can be independently electrically switchable between the first stable equilibrium state and the second stable equilibrium state. In some examples, at least two filter regions 512 of the plurality of filter regions 512 can be electrically coupled to electrically switch, together, between the first stable equilibrium state and the second stable equilibrium state. In some examples, the at least two filter regions 512 can be non-contiguous in the active area of the bistable filter 508. In the example of FIG. 5, the bistable filter 508 is divided into six filter regions 512, arranged in a two-by-three grid. Other suitable numbers of filter regions 512 and arrangements of the filter regions 512 can also be used.

When the headset frame 302 is worn by the user, the controller 310 can further determine an amount of light transmitted through the bistable filter 308 or 508 to the eye of the user. For example, the controller 310 can dim the bistable filter 308 or 508 when the ambient light is excessively bright, such as to improve a comfort of the user, in a manner like sunglasses. Further, the bistable filter 508 can dim all or one or more filter regions 512 to improve contrast with augmented reality graphic elements displayed by the headset. For example, for a graphic element overlaid on an object in a field of view of the eye of the user, the bistable filter 508 can optionally dim one or more filter regions 512 in one or more portions of the field of view corresponding to the object or an area around or near the object, which can increase a contrast of the graphic element.

For discussion that follows, it will be understood that any or all references to the bistable filter 308 can include configurations in which the bistable filter 308 includes a single filter region, such as single filter region 412, and can alternatively include configurations in which the bistable filter 308 includes multiple filter regions, such as filter regions 512.

Returning to FIG. 3, in some examples, the dimmable display system 300 can include a single bistable filter 308. In some examples, the dimmable display system 300 can include two or more bistable filters or bistable filter elements. For example, the dimmable display system 300 can include multiple bistable filters 308, such as a first bistable filter 308A and a second bistable filter 308B. The multiple bistable filters 308 can be arranged in series in an optical path, such that a light ray in the field of view of the eye of the user passes through the multiple bistable filters 308 sequentially.

For example, the bistable filter 308 can include a first bistable filter 308A. The dimmable display system 300 can further include a second bistable filter 308B located between the window 304 and the first bistable filter 308A and at least partially in the field of view of the eye. The second bistable filter 308B can be switchable between a third stable equilibrium state and a fourth stable equilibrium state. The second bistable filter 308B can have a third value of transmissivity when the second bistable filter 308B is in the third stable equilibrium state and a fourth value of transmissivity, different from the third value of transmissivity, when the second bistable filter 308B is in the fourth stable equilibrium state. In some examples, the controller 310 can additionally supply at least one of current or voltage to the second bistable filter 308B to switch the second bistable filter 308B between the third stable equilibrium state and the fourth stable equilibrium state. In some examples, the controller 310 can switch the first bistable filter 308A and the second bistable filter 308B independently.

For configurations in which the first, second, third, and fourth values of transmissivity are all different, the controller 310 can switch the first bistable filter 308A and the second bistable filter 308B such that the (combined) bistable filters 308 can achieve one of four specified values of transmissivity. Specifically, the controller 310 can switch the first bistable filter 308A and the second bistable filter 308B such that the (combined) bistable filter 308 can have a (combined) transmissivity equal to a product of the first and third values of transmissivity, a product of the first and fourth values of transmissivity, a product of the second and third values of transmissivity, or a product of the second and fourth values of transmissivity. Additional bistable filters can optionally be added in series, to provide more specified values of transmittivity for the (combined) bistable filters 308. In some examples, one or more filters can optionally include more than two stable equilibrium states.

In some examples, the multiple bistable filters 308 can be sensitive to polarization. For example, the first bistable filter 308A can absorb light polarized along a first axis, and the second bistable filter 308B can absorb light polarized along a second axis that is orthogonal to the first axis. Other configurations can also be used.

In some examples, the dimmable display system 300 can be configured as an augmented reality headset. For these examples, the augmented reality headset can further include a light projector configured to provide visible light that represents an image. The augmented reality headset can further include a light guide configured to guide the visible light as guided light. The augmented reality headset can further include an output diffractive element configured to diffract at least some of the guided light toward the eye of the user. In some examples, the bistable filter 508 can include a plurality of filter regions 512 that are each electrically switchable between the first stable equilibrium state and the second stable equilibrium state. Each filter region 512 of the plurality of filter regions 512 can extend over a respective active area of the bistable filter 508. The controller 310 can increase a contrast of a region of the image by switching a subset of the plurality of filter regions 512, where the subset corresponds to the region of the image. For configurations in which the dimmable display system 300 is configured as an augmented reality headset and the bistable filter 508 is used to increase the contrast of an image displayed by the augmented reality headset, the bistable filter 508 can dim light from the surroundings but may not dim light that is projected by the augmented reality headset to form the image. For example, for configurations in which a waveguide directs image-forming light from a projector to the eye of the user, the waveguide may be located between the eye and the bistable filter 508.

Figure 6:
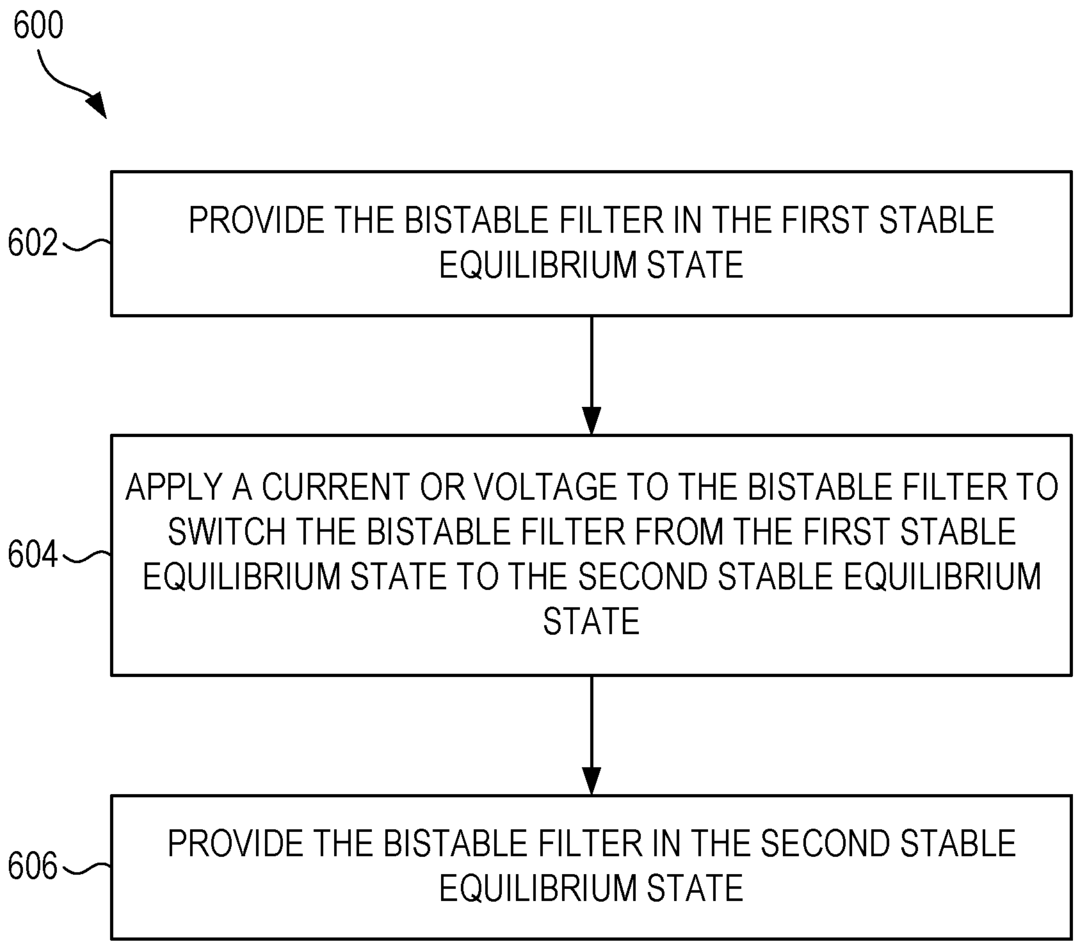
FIG. 6 shows a flow chart of an example of a method for operating a dimmable display system.

FIG. 6 shows a flow chart of an example of a method 600 for operating a dimmable display system, such as the dimmable display system 300. The dimmable display system can include a headset frame, such as the headset frame 302, that is wearable by a user. The dimmable display system can further include a window, such as window 304, disposed in or on the headset frame such that when the headset frame is worn by the user, a field of view of an eye of the user extends through at least part of the window. The dimmable display system can further include a bistable filter, such as the bistable filter 308, located adjacent to the window and at least partially in the field of view of the eye. The bistable filter can be switchable between a first stable equilibrium state and a second stable equilibrium state. The bistable filter can have a first value of transmissivity when the bistable filter is in the first stable equilibrium state and a second value of transmissivity, different from the first value of transmissivity, when the bistable filter is in the second stable equilibrium state. The dimmable display system can further include a controller, such as the controller 310, that can supply at least one of current or voltage to the bistable filter to switch the bistable filter between the first stable equilibrium state and the second stable equilibrium state. The method 600 is but one method for operating a dimmable display system. Other suitable methods can also be used.

At operation 602, the method 600 can include providing the bistable filter in the first stable equilibrium state, during which the controller does not apply any current or voltage to the bistable filter.

At operation 604, the method 600 can include applying a current or voltage to the bistable filter to switch the bistable filter from the first stable equilibrium state to the second stable equilibrium state.

At operation 606, the method 600 can include providing the bistable filter in the second stable equilibrium state, during which the controller does not apply any current or voltage to the bistable filter.

To further illustrate the systems and related methods disclosed herein, a non-limiting list of examples is provided below. Each of the following non-limiting examples can stand on its own or can be combined in any permutation or combination with any one or more of the other examples.

In Example 1, a dimmable display system can comprise: a headset frame wearable by a user; a window disposed in or on the headset frame such that when the headset frame is worn by the user, a field of view of an eye of the user extends through at least part of the window; and a bistable filter located adjacent to the window and at least partially in the field of view of the eye, the bistable filter being switchable between a first stable equilibrium state and a second stable equilibrium state, the bistable filter having a first value of transmissivity when the bistable filter is in the first stable equilibrium state and a second value of transmissivity, different from the first value of transmissivity, when the bistable filter is in the second stable equilibrium state.

In Example 2, the dimmable display system of Example 1 can optionally be configured such that: the bistable filter is electrically switchable between the first stable equilibrium state and the second stable equilibrium state; and the bistable filter does not consume any electrical power when the bistable filter is in the first stable equilibrium state or the second stable equilibrium state.

In Example 3, the dimmable display system of any one of Examples 1-2 can optionally further comprise a controller configured to supply at least one of current or voltage to the bistable filter to switch the bistable filter between the first stable equilibrium state and the second stable equilibrium state.

In Example 4, the dimmable display system of any one of Examples 1-3 can optionally be configured such that: the bistable filter includes a single filter region that is electrically switchable between the first stable equilibrium state and the second stable equilibrium state, the single filter region extending over an active area of the bistable filter; and the bistable filter includes electrodes electrically coupled to the controller and located to provide the current or voltage to the single filter region.

In Example 5, the dimmable display system of any one of Examples 1~4 can optionally be configured such that: the bistable filter includes a plurality of filter regions that are each electrically switchable between the first stable equilibrium state and the second stable equilibrium state, each filter region of the plurality of filter regions extending over a respective active area of the bistable filter; and the bistable filter includes electrodes electrically coupled to the controller and located to provide the current or voltage to filter regions of the plurality of filter regions.

In Example 6, the dimmable display system of any one of Examples 1-5 can optionally be configured such that at least two filter regions of the plurality of filter regions are independently electrically switchable between the first stable equilibrium state and the second stable equilibrium state.

In Example 7, the dimmable display system of any one of Examples 1-6 can optionally be configured such that all of the filter regions of the plurality of filter regions are independently electrically switchable between the first stable equilibrium state and the second stable equilibrium state.

In Example 8, the dimmable display system of any one of Examples 1-7 can optionally be configured such that at least two filter regions of the plurality of filter regions are electrically coupled to electrically switch, together, between the first stable equilibrium state and the second stable equilibrium state.

In Example 9, the dimmable display system of any one of Examples 1-8 can optionally be configured such that the at least two filter regions are non-contiguous in the active area of the bistable filter.

In Example 10, the dimmable display system of any one of Examples 1-9 can optionally further comprise: a light sensor configured to sense an amount of light in at least a portion of the field of view of the eye, the controller being further configured to switch the bistable filter between the first stable equilibrium state and the second stable equilibrium state based on the sensed amount of light.

In Example 11, the dimmable display system of any one of Examples 1-10 can optionally be configured such that: the bistable filter is a first bistable filter; and the dimmable display system further comprises a second bistable filter located between the window and the first bistable filter and at least partially in the field of view of the eye, the second bistable filter being switchable between a third stable equilibrium state and a fourth stable equilibrium state, the second bistable filter having a third value of transmissivity when the second bistable filter is in the third stable equilibrium state and a fourth value of transmissivity, different from the third value of transmissivity, when the second bistable filter is in the fourth stable equilibrium state.

In Example 12, the dimmable display system of any one of Examples 1-11 can optionally be configured such that the controller is further configured to: supply at least one of current or voltage to the second bistable filter to switch the second bistable filter between the third stable equilibrium state and the fourth stable equilibrium state; and switch the first bistable filter and the second bistable filter independently.

In Example 13, the dimmable display system of any one of Examples 1-12 can optionally be configured such that: the first bistable filter is configured to absorb light polarized along a first axis; and the second bistable filter is configured to absorb light polarized along a second axis that is orthogonal to the first axis.

In Example 14, the dimmable display system of any one of Examples 1-13 can optionally be configured such that: the dimmable display system is configured as an augmented reality headset; and the augmented reality headset further comprises: a light projector configured to provide visible light that represents an image; a light guide configured to guide the visible light as guided light; and an output diffractive element configured to diffract at least some of the guided light toward the eye of the user.

In Example 15, the dimmable display system of any one of Examples 1-14 can optionally be configured such that: the bistable filter includes a plurality of filter regions that are each electrically switchable between the first stable equilibrium state and the second stable equilibrium state, each filter region of the plurality of filter regions extending over a respective active area of the bistable filter; and the controller is configured to increase a contrast of a region of the image by switching a subset of the plurality of filter regions, the subset corresponding to the region of the image.

In Example 16, the dimmable display system of any one of Examples 1-15 can optionally be configured such that a light ray in the field of view of the eye passes through one of the window or the bistable filter, then passes through the other of the window or the bistable filter.

Example 17 can include a method for operating a dimmable display system. The dimmable display system can include a headset frame wearable by a user. The dimmable display system can further include a window disposed in or on the headset frame such that when the headset frame is worn by the user, a field of view of an eye of the user extends through at least part of the window. The dimmable display system can further include a bistable filter located adjacent to the window and at least partially in the field of view of the eye. The bistable filter can be switchable between a first stable equilibrium state and a second stable equilibrium state. The bistable filter can have a first value of transmissivity when the bistable filter is in the first stable equilibrium state and a second value of transmissivity, different from the first value of transmissivity, when the bistable filter is in the second stable equilibrium state. The dimmable display system can further include a controller configured to supply at least one of current or voltage to the bistable filter to switch the bistable filter between the first stable equilibrium state and the second stable equilibrium state. The method can comprise: providing the bistable filter in the first stable equilibrium state, during which the controller does not apply any current or voltage to the bistable filter; applying a current or voltage to the bistable filter to switch the bistable filter from the first stable equilibrium state to the second stable equilibrium state; and providing the bistable filter in the second stable equilibrium state, during which the controller does not apply any current or voltage to the bistable filter.

In Example 18, a dimmable display system can comprise: a headset frame wearable by a user; a window disposed in or on the headset frame such that when the headset frame is worn by the user, a field of view of an eye of the user extends through at least part of the window; a bistable filter located adjacent to the window and at least partially in the field of view of the eye such that a light ray in the field of view of the eye passes through one of the window or the bistable filter then passes through the other of the window or the bistable filter, the bistable filter being electrically switchable between a first stable equilibrium state and a second stable equilibrium state, the bistable filter not consuming any electrical power when the bistable filter is in the first stable equilibrium state or the second stable equilibrium state, the bistable filter having a first value of transmissivity when the bistable filter is in the first stable equilibrium state and a second value of transmissivity, different from the first value of transmissivity, when the bistable filter is in the second stable equilibrium state; a light sensor configured to sense an amount of light in at least a portion of the field of view of the eye; and a controller configured to supply at least one of current or voltage to the bistable filter to switch the bistable filter between the first stable equilibrium state and the second stable equilibrium state based on the sensed amount of light.

In Example 19, the dimmable display system of Example 18 can optionally be configured such that: the bistable filter includes a single filter region that is electrically switchable between the first stable equilibrium state and the second stable equilibrium state, the single filter region extending over an active area of the bistable filter; and the bistable filter includes electrodes electrically coupled to the controller and located to provide the current or voltage to the single filter region.

In Example 20, the dimmable display system of any one of Examples 18-19 can optionally be configured such that: the bistable filter includes a plurality of filter regions that are each electrically switchable between the first stable equilibrium state and the second stable equilibrium state, each filter region of the plurality of filter regions extending over a respective active area of the bistable filter; and the bistable filter includes electrodes electrically coupled to the controller and located to provide the current or voltage to filter regions of the plurality of filter regions.

What is claimed is:

1. A dimmable display system, comprising:

a headset frame wearable by a user;

a window disposed in or on the headset frame such that when the headset frame is worn by the user, a field of view of an eye of the user extends through at least part of the window; and a bistable filter located adjacent to the window and at least partially in the field of view of the eye, the bistable filter being electrically switchable between a first stable equilibrium state and a second stable equilibrium state, the bistable filter not consuming any electrical power when the bistable filter is in the first stable equilibrium state or the second stable equilibrium state, the bistable filter having a first value of transmissivity when the bistable filter is in the first stable equilibrium state and a second value of transmissivity, different from the first value of transmissivity, when the bistable filter is in the second stable equilibrium state.

2. The dimmable display system of claim 1, further comprising:

a controller configured to supply at least one of current or voltage to the bistable filter to switch the bistable filter between the first stable equilibrium state and the second stable equilibrium state.

3. The dimmable display system of claim 2, wherein:

the bistable filter includes a single filter region that is electrically switchable between the first stable equilibrium state and the second stable equilibrium state, the single filter region extending over an active area of the bistable filter; and the bistable filter includes electrodes electrically coupled to the controller and located to provide the current or voltage to the single filter region.

4. The dimmable display system of claim 2, wherein:

the bistable filter includes a plurality of filter regions that are each electrically switchable between the first stable equilibrium state and the second stable equilibrium state, each filter region of the plurality of filter regions extending over a respective active area of the bistable filter; and the bistable filter includes electrodes electrically coupled to the controller and located to provide the current or voltage to filter regions of the plurality of filter regions.

5. The dimmable display system of claim 4, wherein at least two filter regions of the plurality of filter regions are independently electrically switchable between the first stable equilibrium state and the second stable equilibrium state.

6. The dimmable display system of claim 4, wherein all of the filter regions of the plurality of filter regions are independently electrically switchable between the first stable equilibrium state and the second stable equilibrium state.

7. The dimmable display system of claim 4, wherein at least two filter regions of the plurality of filter regions are electrically coupled to electrically switch, together, between the first stable equilibrium state and the second stable equilibrium state.

8. The dimmable display system of claim 7, wherein the at least two filter regions are non-contiguous in the active area of the bistable filter.

9. The dimmable display system of claim 2, further comprising:

a light sensor configured to sense an amount of light in at least a portion of the field of view of the eye, the controller being further configured to switch the bistable filter between the first stable equilibrium state and the second stable equilibrium state based on the sensed amount of light.

10. The dimmable display system of claim 2, wherein:

the bistable filter is a first bistable filter; and the dimmable display system further comprises a second bistable filter located between the window and the first bistable filter and at least partially in the field of view of the eye, the second bistable filter being switchable between a third stable equilibrium state and a fourth stable equilibrium state, the second bistable filter having a third value of transmissivity when the second bistable filter is in the third stable equilibrium state and a fourth value of transmissivity, different from the third value of transmissivity, when the second bistable filter is in the fourth stable equilibrium state.

11. The dimmable display system of claim 10, wherein the controller is further configured to:

supply at least one of current or voltage to the second bistable filter to switch the second bistable filter between the third stable equilibrium state and the fourth stable equilibrium state; and switch the first bistable filter and the second bistable filter independently.

12. The dimmable display system of claim 10, wherein:

the first bistable filter is configured to absorb light polarized along a first axis; and the second bistable filter is configured to absorb light polarized along a second axis that is orthogonal to the first axis.

13. The dimmable display system of claim 2, wherein:

the dimmable display system is configured as an augmented reality headset; and the augmented reality headset further comprises:

a light projector configured to provide visible light that represents an image;

a light guide configured to guide the visible light as guided light; and an output diffractive element configured to diffract at least some of the guided light toward the eye of the user.

14. The dimmable display system of claim 13, wherein:

the bistable filter includes a plurality of filter regions that are each electrically switchable between the first stable equilibrium state and the second stable equilibrium state, each filter region of the plurality of filter regions extending over a respective active area of the bistable filter; and the controller is configured to increase a contrast of a region of the image by switching a subset of the plurality of filter regions, the subset corresponding to the region of the image.

15. The dimmable display system of claim 1, wherein a light ray in the field of view of the eye passes through one of the window or the bistable filter, then passes through the other of the window or the bistable filter.

16. A method for operating a dimmable display system, the dimmable display system including a headset frame wearable by a user, the dimmable display system further including a window disposed in or on the headset frame such that when the headset frame is worn by the user, a field of view of an eye of the user extends through at least part of the window, the dimmable display system further including a bistable filter located adjacent to the window and at least partially in the field of view of the eye, the bistable filter being electrically switchable between a first stable equilibrium state and a second stable equilibrium state, the bistable filter not consuming any electrical power when the bistable filter is in the first stable equilibrium state or the second stable equilibrium state, the bistable filter having a first value of transmissivity when the bistable filter is in the first stable equilibrium state and a second value of transmissivity, different from the first value of transmissivity, when the bistable filter is in the second stable equilibrium state, the dimmable display system further including a controller configured to supply at least one of current or voltage to the bistable filter to switch the bistable filter between the first stable equilibrium state and the second stable equilibrium state, the method comprising:

providing the bistable filter in the first stable equilibrium state, during which the controller does not apply any current or voltage to the bistable filter;

applying a current or voltage to the bistable filter to switch the bistable filter from the first stable equilibrium state to the second stable equilibrium state; and providing the bistable filter in the second stable equilibrium state, during which the controller does not apply any current or voltage to the bistable filter.

17. A dimmable display system, comprising:

a headset frame wearable by a user;

a window disposed in or on the headset frame such that when the headset frame is worn by the user, a field of view of an eye of the user extends through at least part of the window;

a bistable filter located adjacent to the window and at least partially in the field of view of the eye such that a light ray in the field of view of the eye passes through one of the window or the bistable filter then passes through the other of the window or the bistable filter, the bistable filter being electrically switchable between a first stable equilibrium state and a second stable equilibrium state, the bistable filter not consuming any electrical power when the bistable filter is in the first stable equilibrium state or the second stable equilibrium state, the bistable filter having a first value of transmissivity when the bistable filter is in the first stable equilibrium state and a second value of transmissivity, different from the first value of transmissivity, when the bistable filter is in the second stable equilibrium state;

a light sensor configured to sense an amount of light in at least a portion of the field of view of the eye; and a controller configured to supply at least one of current or voltage to the bistable filter to switch the bistable filter between the first stable equilibrium state and the second stable equilibrium state based on the sensed amount of light.

18. The dimmable display system of claim 17, wherein:

the bistable filter includes a single filter region that is electrically switchable between the first stable equilibrium state and the second stable equilibrium state, the single filter region extending over an active area of the bistable filter; and the bistable filter includes electrodes electrically coupled to the controller and located to provide the current or voltage to the single filter region.

19. The dimmable display system of claim 17, wherein:

the bistable filter includes a plurality of filter regions that are each electrically switchable between the first stable equilibrium state and the second stable equilibrium state, each filter region of the plurality of filter regions extending over a respective active area of the bistable filter; and the bistable filter includes electrodes electrically coupled to the controller and located to provide the current or voltage to filter regions of the plurality of filter regions.

* * * * *